United States Patent
Starling et al.

(10) Patent No.: US 10,242,065 B1
(45) Date of Patent: Mar. 26, 2019

(54) COMBINING MERKLE TREES IN GRAPH DATABASES

(71) Applicant: EMC IP Holding Company LLC, Hopkinton, MA (US)

(72) Inventors: Jennifer Starling, Lake Forest, CA (US); Adam Brenner, Lake Forest, CA (US); Jeffrey Norton, Laguna Niguel, CA (US); Scott Auchmoody, Irvine, CA (US); Mark D Malamut, Dana Point, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 162 days.

(21) Appl. No.: 15/197,863

(22) Filed: Jun. 30, 2016

(51) Int. Cl.
*G06F 12/14* (2006.01)
*G06F 11/30* (2006.01)
*G06F 17/30* (2006.01)
*H04L 9/06* (2006.01)

(52) U.S. Cl.
CPC .. *G06F 17/30528* (2013.01); *G06F 17/30327* (2013.01); *G06F 17/30958* (2013.01); *H04L 9/0643* (2013.01)

(58) Field of Classification Search
CPC ......... G06F 17/30528; G06F 17/30327; G06F 17/30958; H04L 9/0643
USPC ....................................................... 713/189
See application file for complete search history.

(56) References Cited

U.S. PATENT DOCUMENTS

| 9,705,730 | B1* | 7/2017 | Petri | H04L 29/0854 |
| 2009/0327505 | A1* | 12/2009 | Rao | H04L 9/3236 709/230 |
| 2010/0095064 | A1* | 4/2010 | Aviles | H04L 67/1097 711/118 |
| 2014/0245020 | A1* | 8/2014 | Buldas | G06F 21/64 713/177 |
| 2016/0110261 | A1* | 4/2016 | Parab | G06F 11/1453 707/692 |
| 2016/0112200 | A1* | 4/2016 | Kheterpal | H04L 9/0643 380/28 |
| 2016/0218879 | A1* | 7/2016 | Ferrin | H04L 9/3247 |
| 2017/0300877 | A1* | 10/2017 | Mann | G06Q 20/0655 |

OTHER PUBLICATIONS

Shai HaleviProofs of Ownership in Remote Storage Systems; ACM 2011; p. 491-500.*

* cited by examiner

*Primary Examiner* — Monjur Rahim
(74) *Attorney, Agent, or Firm* — Staniford Tomita LLP

(57) ABSTRACT

Combining a Merkle tree with a graph database by defining a Merkle tree with each node having a hashed value of the metadata for the node and any children of that node, associating non-hashed data with the hashed data for each node, wherein the non-hashed data has an up-pointer from a child node to any of its immediate parent node, and defining bi-directional edges between the nodes of the Merkle tree having a graph database structure to create a reference for the up-pointers associated with each Merkle tree node. The bi-directional edges with up-pointers along with the Merkle tree hash scheme allows efficient traversal of the tree where the hash values indicate non-changed nodes to prevent traversing the database, and further allows efficient path definitions by allowing database processes to walk up edges.

13 Claims, 7 Drawing Sheets

COMBINING MERKLE TREES IN GRAPH DATABASES

TECHNICAL FIELD

Embodiments are generally directed to database processing, and more specifically to embedding or combining Merkle trees in graph databases.

BACKGROUND

A Merkle tree is a tree data structure where every node is referenced by a hash. The hash is created by hashing the contents of the node, including any children the node may have. At each node, the hash is dependent on all direct descendent hashes (children). FIG. 1 illustrates an example of a Merkle tree structure, as presently known. As shown in diagram 100, a top hash level has children Hash_0 and Hash_1, which respectively have children Hash_0-0 and Hash_0-1, and Hash_1-0 and Hash_1-1. Hashes at each level are dependent on the hash value or values below. If any hash changes then the parent hash will change and these changes are percolated up to the top of the tree. Changes to the hash value of a node may occur due to a change in the data at the node or the addition/deletion/change to any of its child nodes. Conversely, if a hash at a certain level has not changed, this indicates that no hash or data below has changed either. This represents the power of Merkle trees, namely they provide an extremely efficient method of determining if large sets of data has not changed. The properties of the Merkle tree thus provide very efficient storage of a system changing over some period of time.

Merkle trees are generally built from the bottom-up, i.e., hash values of children determine the hash of a parent and so on up the tree. However, because of this a Merkle tree has only downward pointing references because a node at one level has a value that is only dependent on itself and its immediate child nodes. The lack of any upward pointing references limits its use in many applications. For example, in the Merkle tree implementation, it is necessary to query all data in the Merkle tree to find a parent that contains the given child's hash since it only has down references. This can be a very expensive query, especially in enterprise-level applications with millions to billions of records. This problem is exacerbated in databases with multiple levels, such as tree-based file systems, since finding the grandparents (or any higher-level parent), would require multiple expensive queries for each level of ancestor.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, and Data Domain Restorer are trademarks of EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
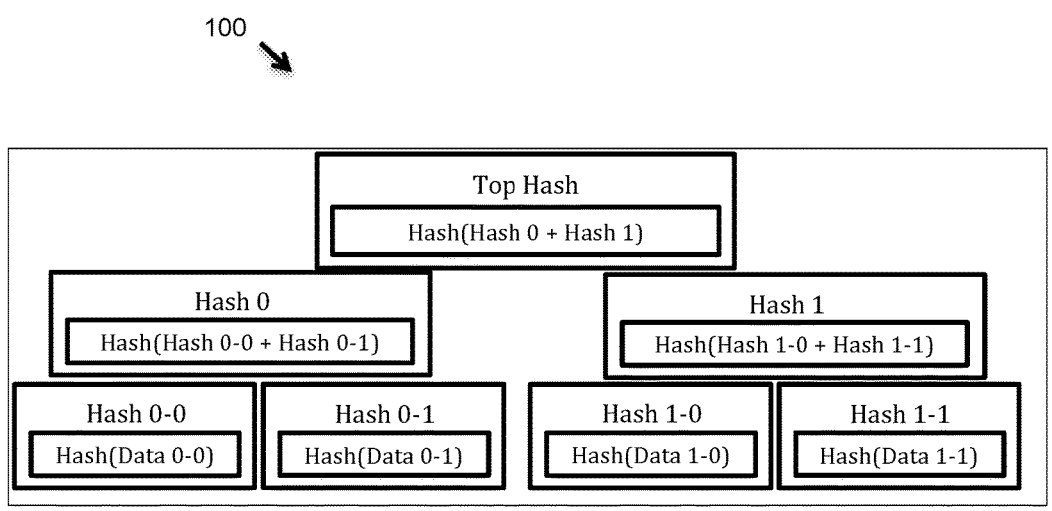
FIG. 1 illustrates an example of a Merkle tree structure, as presently known.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard-coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Embodiments are directed to a processing component in or associated with a server computer using a graph database to store a Merkle tree to provide upward-pointing references of the graph database along with the downward-pointing references of the Merkle tree structure to provide powerful techniques for tree traversal.

Figure 2:
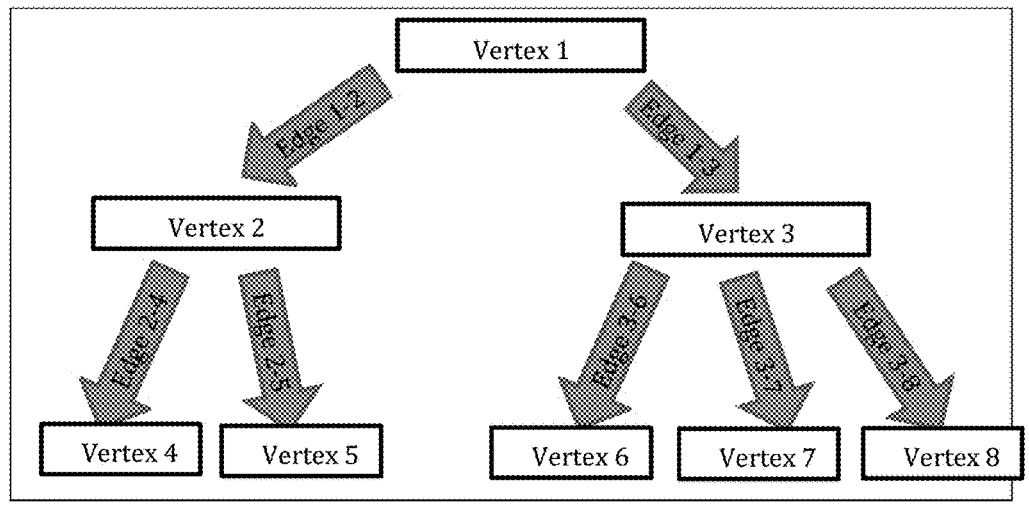
FIG. 2 illustrates a graph database structure that may be combined with a Merkle tree under some embodiments.

As stated above, a Merkle tree is a tree data structure where every node is referenced by a hash. The hash is created by hashing the contents of the node, including any children the node may have. In an embodiment, a Merkle tree is implemented or embedded in a graph database. FIG. 2 illustrates a graph database structure that may be combined with a Merkle tree under some embodiments. In general, a graph database is a database that uses graph structures for semantic queries with nodes, edges and properties to represent and store data. The key to graph databases is that edges represent relationships that directly relate data items in the store, as opposed to conventional relational databases, where links between data are based on the data itself. Graph databases are designed to allow simple and rapid retrieval of complex hierarchical structures without requiring complex queries, and use the fact that meaningful patterns emerge when examining the connections and interconnections (edges) of nodes and their pertinent information (properties). FIG. 2 illustrates an example graph database structure in which three levels of vertices (nodes) are organized into a tree structure with vertex 1 having child vertices 2 and 3 with vertex 2 having child vertices 4 and 5, and vertex 3 having child vertices 6, 7, and 8. The edges between the vertices are labeled with the corresponding parent-child number, i.e., Edge p-c. In a graph database, records in the graph vertices are connected through typed, directed arcs, called edges that represent relationships. Each node and edge can have named attributes referred to as properties.

A graph database is designed to persist relationships of objects. The built-in capabilities of a graph database allow for connecting parents and children in an efficient manner. Adding hashes as the reference key or label creates a Merkle tree within a graph. This significantly provides the advantages of the properties of a Merkle tree in a graph structure and provides very efficient techniques for tree traversal. For example, given a family tree and the name of a child, find the name of the child's parents. Using the natural capabilities of the graph database, it allows a user to perform a quick search for the child by name which will return the vertex containing the child's information. From there the user can quickly traverse the edges of the graph for that child's parent, and even continue up the tree for grandparents and so on. With respect to Merkle trees, these have the property that if the hash of an object is not changed, then no object that the object is dependent on (i.e., children, grandchildren, etc.) has changed either. This makes it unnecessary to traverse that part of the graph, which can provide great efficiencies to the system.

Figure 3:
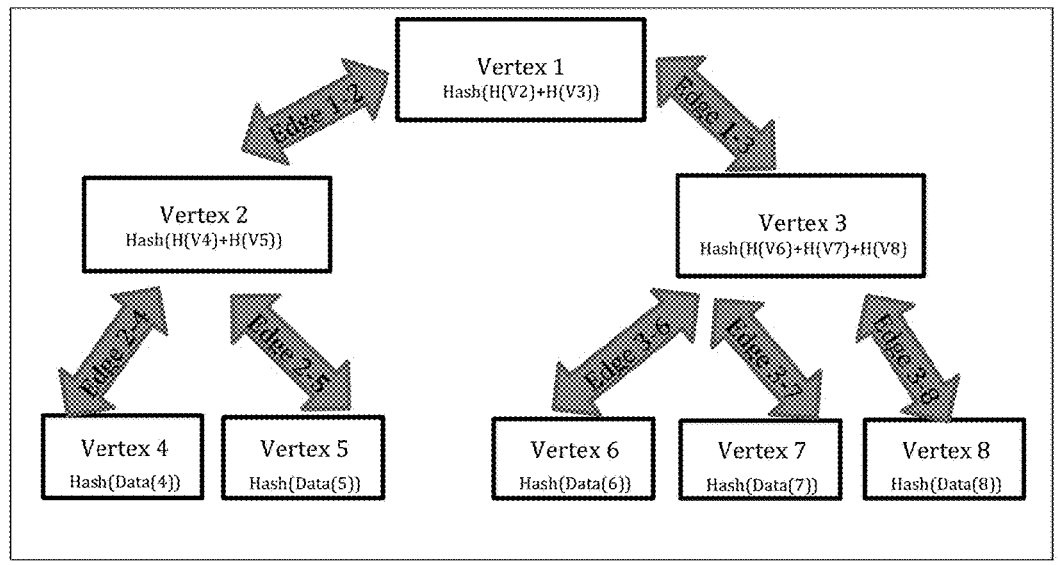
FIG. 3 illustrates a tree structure represented as a graph database with an embedded Merkle tree under some embodiments.

FIG. 3 illustrates a tree structure represented as a graph database with an embedded Merkle tree under some embodiments. As shown in FIG. 3, the graph database of FIG. 2 is combined with a Merkle tree by having its parent nodes populated with the hash values of the child nodes. Thus, as built from the bottom-up, vertex 2 has values for vertices 4 and 5, Hash(H(V4)+H(V5)), and vertex 3 has values for vertices 6, 7, and 8, Hash(H(V6)+H(V7)+H(V8)). Vertex 1 then has the hash values for vertices 2 and 3, Hash(H(V2)+H(V3)). The edges connecting each of these vertices is a bi-directional edge denoted Edge p-c.

As shown in the example of FIG. 3, embodiments utilize a graph that is a group of objects (vertex or node) that are connected by a first-class object (edge). There is no strict parent/child relationship in a graph as there is in a tree because any object can reference any other object, as shown by the bi-directionality of the edges. By adding restrictions on which objects can reference other objects, the process can create a tree structure in a graph. The resulting tree therefore is a special type of graph where it restricts relations to be parent-child relations, and each edge must be directed. In addition, by using hashes as the reference key, the process creates a Merkle tree within a graph. As stated above, this allows the process to use the natural capabilities of the graph database to quickly search for the child by name which will return the vertex containing the child's information, and to traverse the edges of the graph for that vertex's parent, grandparents, etc. This bi-directional edge with up-pointers along with the original Merkle tree hash scheme allows for efficient traversal of the tree where the hash values indicate non-changed nodes and allow this section of the database to not be traversed. It also allows efficient path definitions and data location by allowing database processes to walk up edges, as opposed to only down edges, as in a Merkle tree alone.

Figure 4:
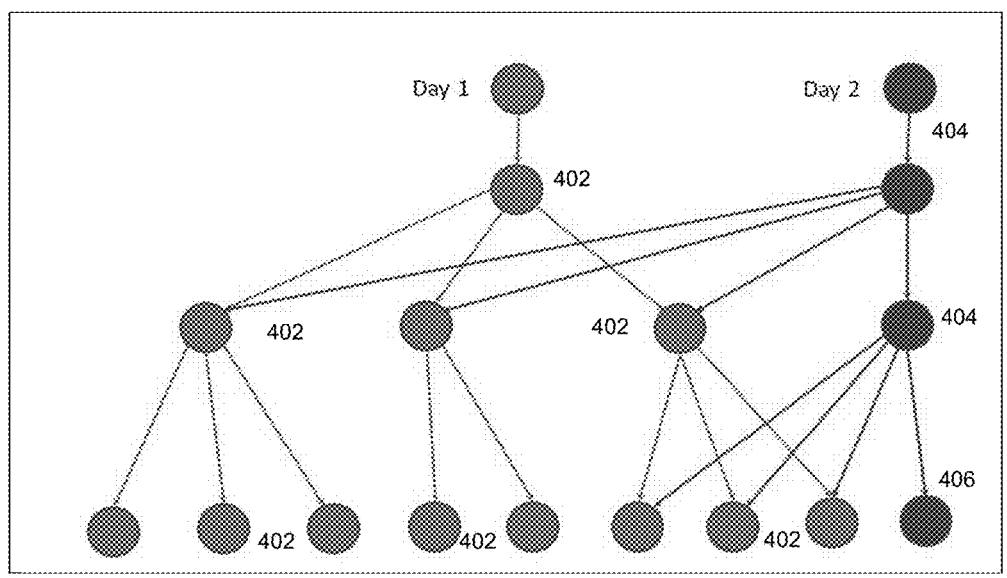
FIG. 4 illustrates an example use of the combined Merkle tree and graph database, under an embodiment.

The properties of the Merkle tree give a very efficient storage of a system changing over some period of time. A typical file system changes on the order of about 0.03% per day, which is why deduplication backups are so useful. Limiting tree traversal to such a small percentage (0.03%) of the full graph also helps realize huge efficiency gains as operations can run orders of magnitude faster. This tree traversal efficiency is achieved by combining the Merkle Tree with a graph database. For each representation, a large portion of the graph (e.g., on the order of 99% of the vertices) can be persisted through the iterations in a system changing at this type of rate. This is done by creating new edges connecting the new parent vertex (or vertices) along with the existing (unchanged) vertices to a new vertex. FIG. 4 illustrates an example use of the combined Merkle tree and graph database, under an embodiment. FIG. 4 shows a multi-tree representing a connected system of data that changes over time (e.g., between Day 1 and Day 2). In this case, the vertices 402 and their edges represent the system on Day 1. The vertex 406 on the bottom right is a new object on Day 2, and vertices 404 represent updated parents and edges for Day two. For each representation, a large portion of the graph can be persisted through certain iterations. This is done by creating new edges connecting the new parent vertex (or vertices) along with the existing (unchanged) vertices to a new vertex as is shown in FIG. 4. FIG. 4 is only intended to illustrate a representative combined Merkle tree graph for purposes of example only, and tree/graph datasets processed in the system may be different and much larger.

Using a graph database for the Merkle tree also makes deletion very efficient. In present systems, to delete a node of a Merkle tree, one first needs to find out if any other node currently references it. Since the Merkle tree only has down pointers, this can be a very expensive query. Using the natural traversal power of a graph database as described herein, however, the query is very efficient since each vertex has a list of "up" pointers, these can be quickly queried to find out if a specific node can be deleted.

Figure 5A:
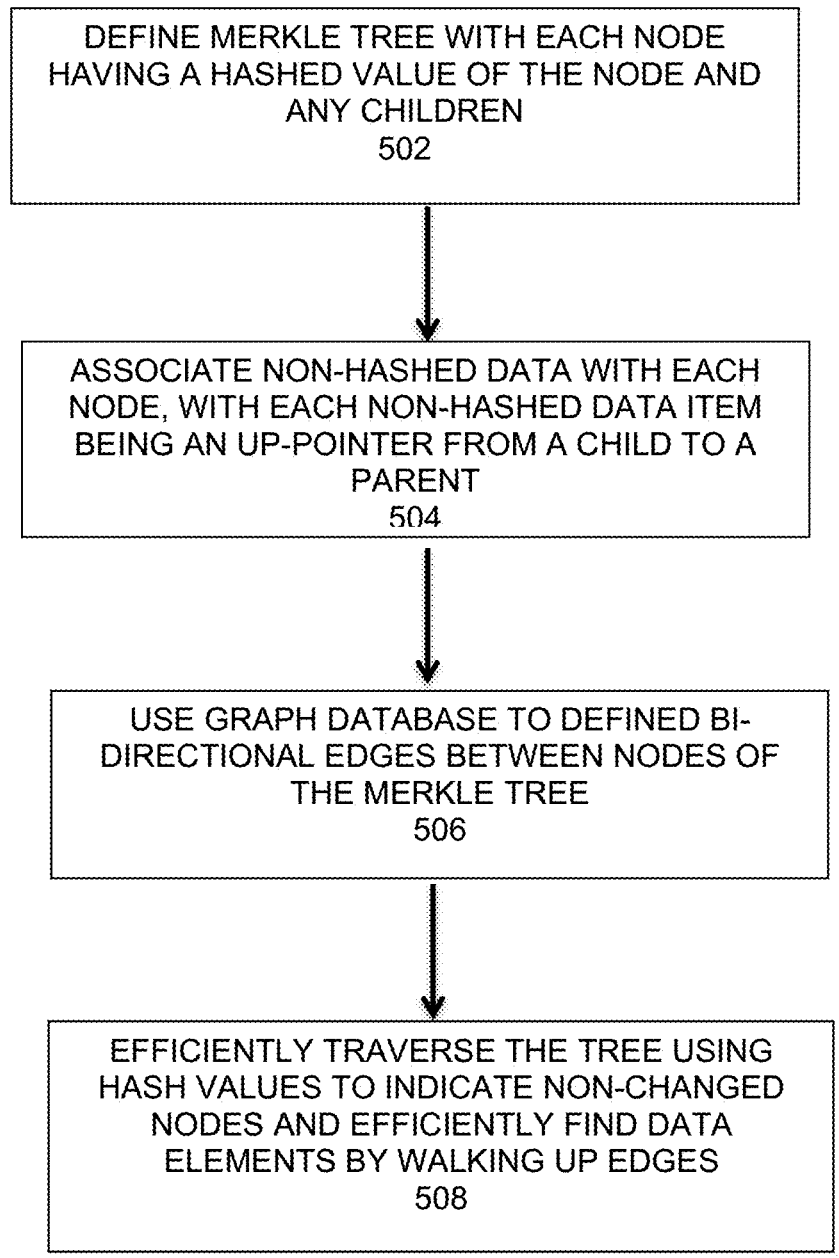
FIG. 5A is a flowchart that illustrates a method of combining or embedding a Merkle tree in a graph database under an embodiment.

FIG. 5A is a flowchart that illustrates a method of combining or representing a Merkle tree in a graph database under a first embodiment. In this embodiment, the Merkle tree is first defined in a usual manner with each node having a hashed value of the metadata for the node and that of any children of that node, step 502. The process then associates non-hashed data with the hashed data for each node. The non-hashed data comprises an up-pointer from a child node to any of its immediate parent nodes, step 504. The non-hashed data can be associated with the hashed data in a defined manner, such as encoding the up-pointer according to a defined scheme, and then concatenating the non-hashed data with the hashed data in an appropriate Merkle tree format. Alternatively, a separate data structure may be defined for the non-hashed data and associated with a corresponding Merkle tree node through an index or pointer. The data structure below indicates a possible association scheme for the non-hashed and hashed data for a combined Merkle tree and graph database under an embodiment.

| HASHED METADATA OF NODE AND CHILDREN | NON-HASHED UP-POINTER FROM CHILD TO PARENT(S) |
| --- | --- |

As shown in step 506, a graph database structure is used to define bi-directional edges between the nodes of the Merkle tree. This creates the reference for the up-pointers encoded or associated with each Merkle tree node. As stated above, this bi-directional edge with up-pointers and the original Merkle tree structure allows for efficient traversal of the tree since non-changed nodes are easily identified prevent unnecessary traversal.

Figure 5B:
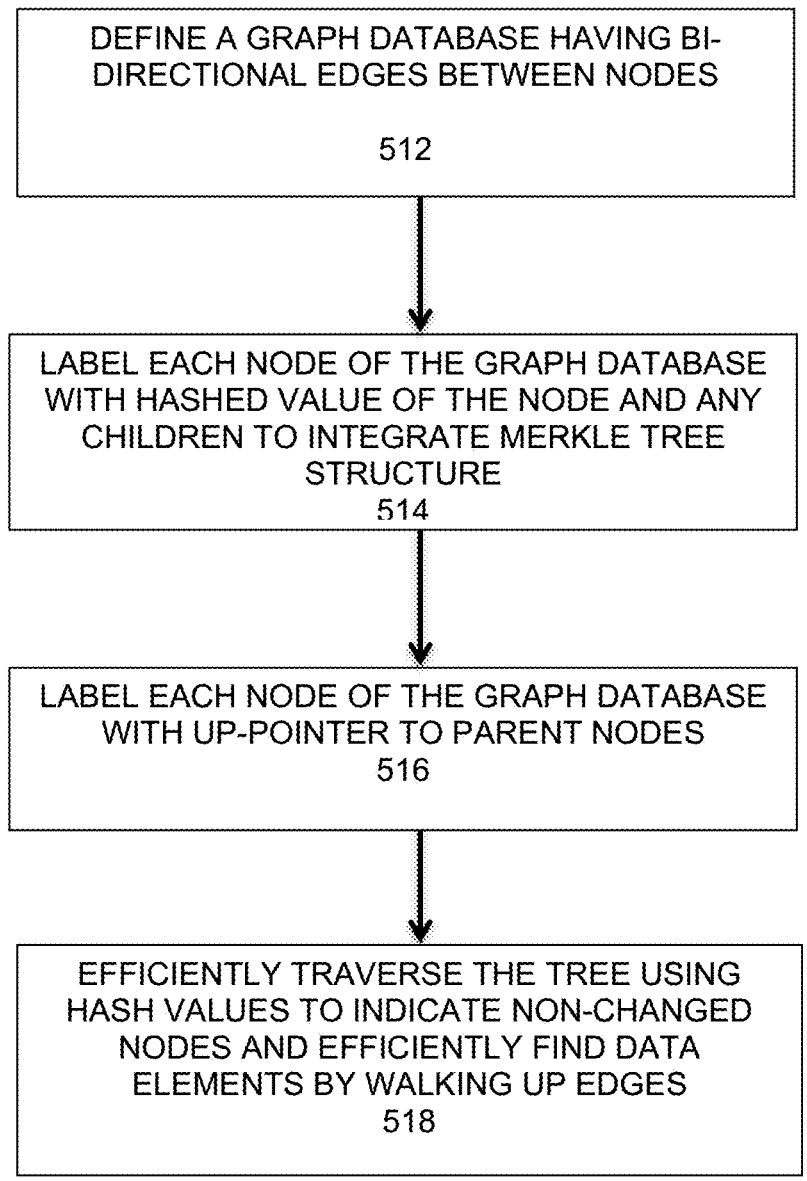
FIG. 5B is a flowchart that illustrates a method of combining or embedding a Merkle tree in a graph database under an alternative embodiment.

In an embodiment, a Merkle tree is "combined" with a graph database by defining a Merkle tree and then incorporating certain graph database elements into the Merkle tree, as shown in FIG. 5A which illustrates a process that starts with a Merkle tree. Alternatively, the Merkle tree can be combined with a graph database by starting with a graph database and labeling nodes and properties to include the Merkle tree elements. In this alternative embodiment, the process starts with a graph database, and FIG. 5B is a flowchart that illustrates a method of combining a Merkle tree with a graph database under this alternative embodiment. As shown in step 512, the process starts by defining a graph database having bi-directional edges between the nodes. Using graph database processes, each node is labeled with the hashed value of the node and any children to integrate the Merkle tree structure into the graph database, step 514. In step 516, each node is also labeled with the up-pointers to the node's parent node. These associations can be done using any appropriate labeling or property definition within the graph database rules and configuration. For example, the graph database typically comprises a plurality of vertices and edges to store database data, wherein records are stored in the vertices, and the edges comprise typed, directed arcs. Each vertex and edge may be assigned named attributes (referred to as properties) and these can be encoded in any appropriate manner. Once this association is made, the tree can be efficiently traversed using the hash values and/or the data easily located using the bi-directional edges and up-pointers, step 518.

Figure 6:
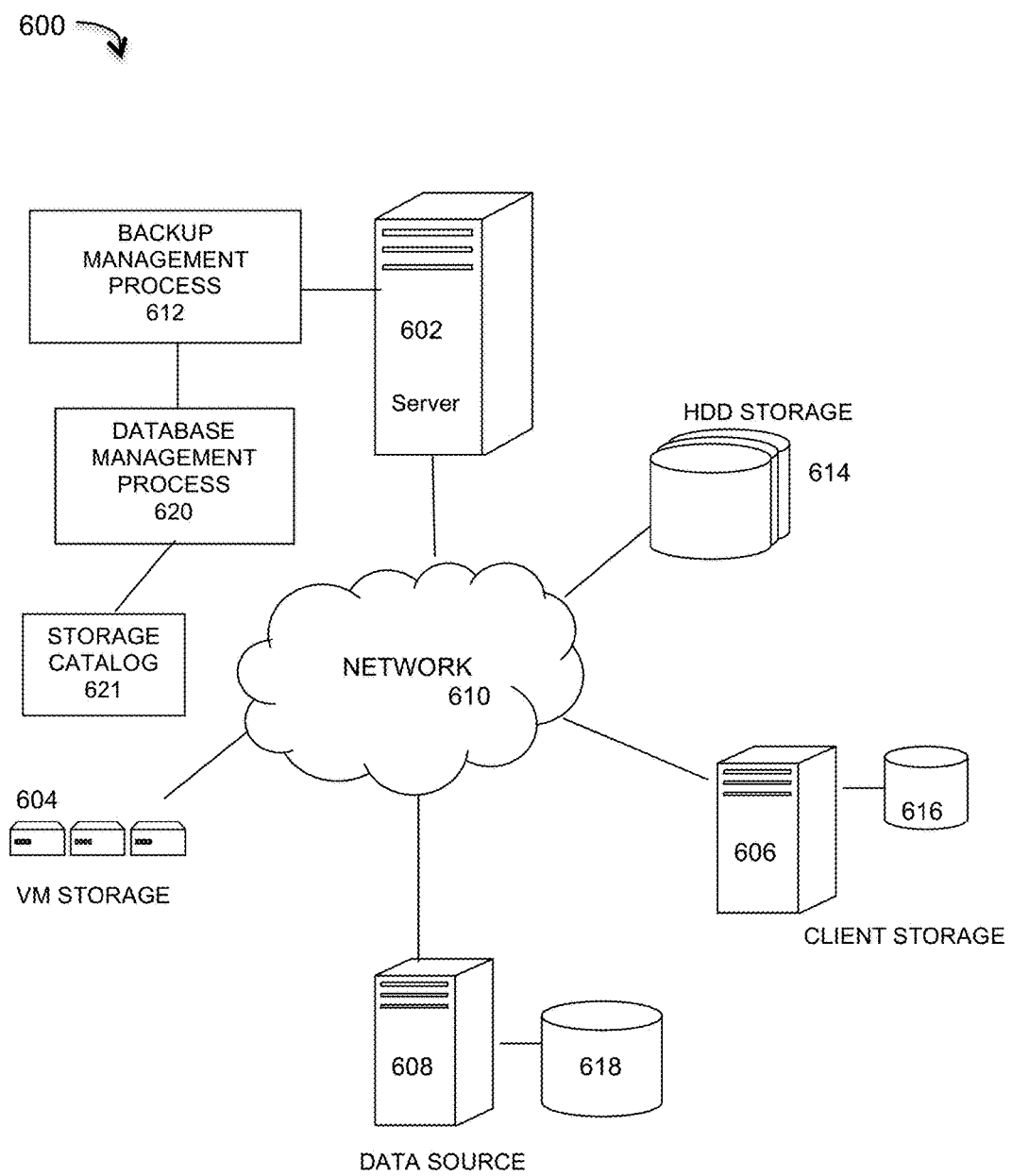
FIG. 6 is a block diagram of a computer network that implements a data structure comprising a Merkle tree combined with a graph database under some embodiments.

Embodiments of the combined Merkle tree and graph database process may be used in a wide variety of applications that may be implemented in whole or in part by a network of computers. These include file management (e.g., security systems, human resource databases), computer and storage networks including client-server systems, cloud networks, social network systems, and so on. Another important application is in the field of large-scale data backup systems. FIG. 6 is a block diagram of a computer network that implements a data structure comprising a Merkle tree combined with a graph database under some embodiments. This network may represent an implementation that performs a deduplicated storage catalog function in addition to other data backup processes. In system 600, a backup server 602 executes a backup management process 612 that coordinates or manages the backup of data from one or more data sources 608 to storage devices (e.g., HDD (hard disk drives) or SSD (solid-state drives)), network storage, client storage 606, and/or virtual storage devices 604. With regard to virtual storage 614, any number of virtual machines (VMs) or groups of VMs may be provided to serve as backup targets. The various storage devices serve as target storage devices for data backed up from one or more data sources, such as computer 608, which may have attached local storage 618 or utilize networked accessed storage devices 614. Data source 608 represents one of many possible backup agents that initiate save sessions to backup their data to storage devices on the network 600 through the backup server 602 and backup management process 612.

The data may be locally sourced or remotely sourced, and the client 608 may initiate save or backup sessions on an automatically scheduled basis or a manually initiated basis. In a data protection scenario, client 108 usually initiates data backups (e.g., full, incremental, differential, etc.) on a regular periodic schedule, such as hourly, daily, weekly, and so on. The sourced data may be any type of data, such as database data that is part of a database management system. In this case, the data may reside on one or more hard drives (e.g., 618) and may be stored in the database in a variety of formats. One example is an Extensible Markup Language (XML) database, which is a data persistence software system that allows data to be stored in XML format. Another example is a relational database management system (RDMS) that uses tables to store the information. Computer 608 may represent a database server that instantiates a program that interacts with the database. Each instance of a database server may, among other features, independently query the database and store information in the database, or it may be an application server that provides user interfaces to database servers, such as through web-based interface applications or through virtual database server or a virtual directory server applications.

A network server computer 602 is coupled directly or indirectly to the network storage devices 614, client storage 616, data sources 608, and VMs 604 through network 610, which may be a cloud network, LAN, WAN or other appropriate network. Network 610 provides connectivity to the various systems, components, and resources of system 600, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud-computing platform. In an embodiment, system 600 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 600 may be stored in any number of persistent storage locations and devices, such as local client storage, server storage (e.g., 618). The backup management process 612 causes or facilitates the backup of this data to other storage devices of the network, such as network storage 614 which may at least be partially implemented through storage device arrays, such as RAID components. In an embodiment network 600 may be implemented to provide support for various storage architectures such as storage area network (SAN), Network-attached Storage (NAS), or Direct-attached Storage (DAS) that make use of large-scale network accessible storage devices 614, such as large capacity disk (optical or magnetic) arrays.

For the embodiment of FIG. 6, network system 600 includes a server 602 that executes a data backup process through processes to define and control the various network resources. The network resources comprising the various servers, clients, data storage devices, and other components may represented as data elements stored and processed in a database that is managed using a database management process 620. The data elements for the network resources may be stored in a storage catalog 621 in any appropriate format.

In an embodiment, data in storage catalog 621 is represented in tree structure format, and processed accordingly. For example, process 620 may implement a SQL-based database management process to model and manage the network in one or more graph databases and/or Merkle trees. In an embodiment, process 620 includes a process that combines the Merkle tree and graph database structures in at least one manner described above to process the data in storage catalog 621. This allows the user or system administrator to manage the network the network configuration such as through the addition, deletion, or reassignment of storage devices, the network topography and definition changes. The combined Merkle tree/graph database allows for efficient traversal of the network tree (or graph), which may include a large plurality of elements, and also allows particular elements to be located through both upward and downward pointing links. In an embodiment, system 600 may represent a Data Domain Restorer (DDR)-based de-duplication storage system, and storage server 602 may be implemented as a DDR De-duplication Storage server provided by EMC Corporation. However, other similar backup and storage systems are also possible.

Figure 7:
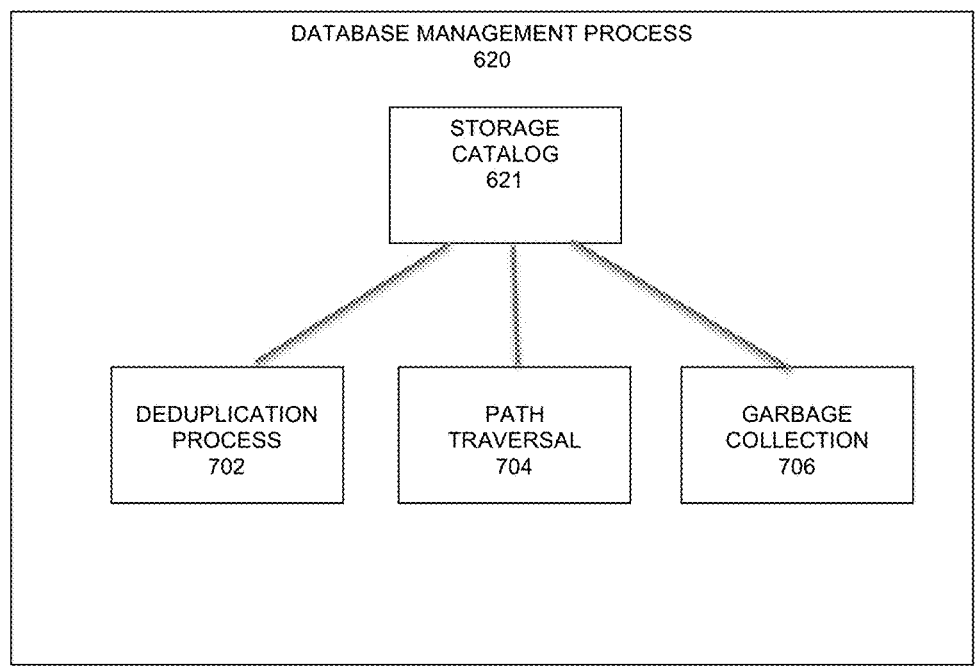
FIG. 7 illustrates some example database management processes implemented in the network of FIG. 6 under some embodiments.

In a catalog-based system such as shown in FIG. 6, it is necessary to efficiently walk up and down the file tree as well as perform efficient garbage collection and other similar processes. In general, these processes are greatly facilitated through the use of a graph database with embedded Merkle tree. FIG. 7 illustrates some example database management processes implemented in the network of FIG. 6 under some embodiments. As shown in FIG. 7, the main illustrative components within the database management process 620 that act on data in storage catalog 621 include a deduplication process 702, a path traversal algorithm 704, and a garbage collection process 706.

With respect to the deduplication process 702, deduplication generally refers to walking a file tree in a very efficient manner. The most efficient way is to avoid walking through the parts of the file tree (represented as a graph) that have not changed. Referring to FIG. 4, the vertices 402 which are pointed to by both edges from nodes 402 and nodes 404 are those whose hashes have not been modified between day 1 and day 2. Therefore, for the purposes of walking the file tree, it is not necessary to do any further processing once those vertices with the same hash labels have been encountered.

With respect to the path traversal algorithm 704 to determine paths and savesets, an important part of a catalog is to give critical file information like the path to the file and the savesets that particular version of the file resides in. This is a critical strength that the graph database provides, which is not currently available when using a standard Merkle tree as is used in current implementations of deduplicated storage systems. To determine a path, or multiple paths in multiple data savesets, the process simply walks up the edge(s) that come into a particular vertex using the "up edges". By walking all the "up edges" through all the vertices, one can easily get the path of a file (the vertices taken in reverse order of walking up the tree) and all the savesets referred to by that path (the last vertex when walking up the graph up edges).

With respect to the garbage collection process 706, garbage collection is the process of deleting references to any data that is no longer referred to in a data collection. It is also the systematic recovery of pooled computer storage that is being used by a program when that program no longer needs the storage, and frees the storage for use by other programs (or processes within a program). During normal operation of the backup process 612, savesets are expired after some period; if files or directories have been deleted and are no longer referred to by another saveset, then references (the vertices) should be deleted. This is typically an extremely efficient operation in a graph database. When a vertex is to be deleted, the process counts all edges coming in ("up edges") to the vertex. If there is more than one up edge referring to the vertex, then there are other savesets referring to that vertex (file or directory) and it cannot be deleted. Otherwise there is only one up edge, and the vertex and everything "below" it should be deleted. This approach actually has an advantage over existing garbage collection methods that are two-pass methods designed to overcome their inherent inability to walk up the tree to all referring savesets. In an embodiment, garbage collection process 706 is implemented as a one-pass operation as long as a save operation is not occurring at the same time as a garbage collection, which is a situation that would cause a race condition.

Another potential application for computer networks is to consider how often the hashes change in the Merkle tree over time. This addresses the question of hot and cold storage; namely, if a particular part of the network does not change over some long period of time (known by the hash not changing), then all the devices and the data on them is stale or cold and should be moved to cheaper, slower storage media. Likewise, if hashes are changing very frequently on slower media, then the data is hot and should be moved to more efficient (and expensive) media. This application of cold and hot data may also be implemented in a recommender system that tracks usage and provides configuration recommendations. Storing customer preferences, purchases, and other critical sales behavior data in a graph database with an embedded Merkle tree allows recommender systems to track which particular items and grouping of items are changing fastest (the hot areas). These hot areas represent new sales opportunities, while the cold or stagnant items or groupings represent items that are no longer producing sufficient customer interest to maintain.

Mapping a Merkle tree into a graph database can be used to map existing systems based on Merkle tree technology into a graph database with the Merkle tree embedded. This converts these legacy representations into a graph database, which then allows the newer algorithms of garbage collection, path extraction, etc., to be applied.

In FIGS. 6 and 7, The database management process 620 implements a Merkle tree and graph database combining process that may start by defining a Merkle tree and then incorporating the graph database, as shown in FIG. 5A, or it may implement a process that starts with a graph database and applied appropriate labeling to include the Merkle tree, as shown in FIG. 5B. With respect to this alternate embodiment, labeling an existing graph with hashes in a Merkle tree format has an interesting side effect. When applied to the network discovery problem, that is, determining which devices are in a computer or storage network, it provides a way to determine circular references within the network. If any item encountered is labeled in a previously unlabeled representation, the object has been encountered previously. Similarly, any object on which the hash changes without stopping also is within a circular reference.

Although embodiments have been described with respect to certain processes performed on storage catalog data processed by a backup management process, embodiments are not so limited. Any other appropriate backup process or network resource of file directly element handled within the system through database functions may also be processed using the combined Merkle tree/graph database methods described herein. Likewise, although certain embodiments are described with respect to data within a large-scale data backup system, any other data processing or "big data" processing system may also use embodiments described herein, such as social networks, enterprise/corporate data, and other distributed data applications.

In this specification, these implementations, or any other form that the invention may take, may be referred to as techniques. In general, the order of the steps of disclosed processes may be altered within the scope of the invention. Some embodiments of the invention involve automated backup related processes executed in a distributed system or other database processing operations that are performed over a distributed network, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer implemented method of implementing a Merkle tree having bi-directional edges to process data in a database, the method comprising:

defining, by a hardware processor executing a database management process, a Merkle tree with each node having a hashed value of the metadata for the node and that of any children of that node;

associating non-hashed data with the hashed data for each node, wherein the non-hashed data comprises an initial up-pointer from a child node to any of its immediate parent node;

defining, by the processor, a graph database using graph structures for semantic queries with nodes, bi-directional edges and properties to represent the data;

combining the Merkle tree and graph database to define up-pointers and down-pointers comprising edges between the nodes of the Merkle tree using the bi-directional edges of the graph database to create a reference for the initial up-pointers associated with each Merkle tree node to thereby facilitate efficient traversal of the database through both the up-pointers and down-pointers, and efficient detection of any change in the database through changes in the hashed data, and wherein the bi-directional edges with the initial up-pointers along with the original Merkle tree hash scheme allows for efficient traversal of the tree where the hash values indicate non-changed nodes to prevent traversing corresponding sections of the database, and further allows efficient path definitions and data location by allowing database processes to walk up edges; and storing the Merkle tree in a memory coupled to the processor.

2. The method of claim 1 wherein the non-hashed data is associated with the hashed data by encoding the initial up-pointer according to a defined scheme and concatenating the non-hashed data with the hashed data.

3. The method of claim 1 wherein the non-hashed data is associated with the hashed data by encoding the initial up-pointer according to a defined scheme and defining a separate data structure for the non-hashed data, and associating it with a corresponding Merkle tree node through an index or pointer.

4. The method of claim 1 further comprising assigning a weighted value to each up-pointer to represent a bias associated with a corresponding node.

5. The method of claim 1 wherein the database represents a deduplicated storage catalog maintained in a large-scale data storage network executing a backup process from one or more data sources to a plurality of storage devices.

6. The method of claim 5 wherein network devices and resources are stored as corresponding data elements in a storage catalog processed by the database management process associated with a backup management server, and wherein functions using the Merkle tree for the data elements include deduplication, path traversal, and garbage collection processes.

7. A method of implementing a graph database having hash-encoded nodes to process data in a database, comprising:

defining, by a hardware processor executing a database management process, a graph database using graph structures for semantic queries with nodes, bi-directional edges and properties to represent the data;

labeling each node with the hashed value of the node and any children to integrate a Merkle tree structure into the graph database;

labeling each node with initial up-pointers to the node's parent node; wherein the integrated Merkle tree and graph database define up-pointers and down-pointers comprising edges between the nodes of the Merkle tree using the bi-directional edges of the graph database to create a reference for the initial up-pointers associated with each Merkle tree node to thereby facilitate efficient traversal of the database through both the up-pointers and down-pointers, and efficient detection of any change in the database through changes in the hashed data, wherein the bi-directional edges with the initial up-pointers along with the original Merkle tree hash scheme allows for efficient traversal of the tree where the hash values indicate non-changed nodes to prevent traversing corresponding sections of the database, and further allows efficient path definitions and data location by allowing database processes to walk up edges; and storing the Merkle tree in a memory coupled to the processor.

8. The method of claim 7, wherein database records are stored in the nodes of the graph database, and the bi-directional edges comprise typed, directed arcs.

9. The method of claim 8 wherein each node and edge is assigned named attributes that are encoded to include the initial up-pointers as non-hashed data and the hashed value of the node in the Merkle tree format.

10. The method of claim 7 further comprising assigning a weighted value to each up-pointer to represent a bias associated with a corresponding node.

11. The method of claim 7 wherein the database represents a deduplicated storage catalog maintained in a large-scale data storage network executing a backup process from one or more data sources to a plurality of storage devices.

12. The method of claim 11 wherein network devices and resources are stored as corresponding data elements in a storage catalog processed by the database management process associated with a backup management server, and wherein functions using the Merkle tree for the data elements include deduplication, path traversal, and garbage collection processes.

13. A computer program product, comprising a non-transitory computer-readable medium having a computer-readable program code embodied therein, the computer-readable program code adapted to execute a method of implementing a Merkle tree in a graph database to process data in a database, comprising:

defining, by a hardware processor executing a database management process, a Merkle tree with each node having a hashed value of the metadata for the node and that of any children of that node;

associating non-hashed data with the hashed data for each node, wherein the non-hashed data comprises an initial up-pointer from a child node to any of its immediate parent node;

defining, by the processor, a graph database using graph structures for semantic queries with nodes, bi-directional edges and properties to represent the data;

combining the Merkle tree and graph database to define up-pointers and down-pointers comprising edges between the nodes of the Merkle tree using the bi-directional edges of the graph database to create a reference for the initial up-pointers associated with each Merkle tree node to thereby facilitate efficient traversal of the database through both the up-pointers and down-pointers, and efficient detection of any change in the database through changes in the hashed data, wherein the bi-directional edges with the initial up-pointers along with the original Merkle tree hash scheme allows for efficient traversal of the tree where the hash values indicate non-changed nodes to prevent traversing corresponding sections of the database, and further allows efficient path definitions and data location by allowing database processes to walk up edges; and storing the Merkle tree in a memory coupled to the processor.

* * * * *